(12) United States Patent
Harada

(10) Patent No.: US 10,855,862 B2
(45) Date of Patent: Dec. 1, 2020

(54) READING DEVICE AND IMAGE FORMING APPARATUS

(71) Applicant: KYOCERA Document Solutions Inc., Osaka (JP)

(72) Inventor: Hiroyuki Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/604,007

(22) PCT Filed: Oct. 24, 2018

(86) PCT No.: PCT/JP2018/039495
§ 371 (c)(1),
(2) Date: Oct. 9, 2019

(87) PCT Pub. No.: WO2019/097968
PCT Pub. Date: May 23, 2019

(65) Prior Publication Data
US 2020/0036848 A1 Jan. 30, 2020

(30) Foreign Application Priority Data
Nov. 15, 2017 (JP) .................................. 2017-219980

(51) Int. Cl.
*H04N 1/04* (2006.01)
*H04N 1/00* (2006.01)
(Continued)

(52) U.S. Cl.
CPC ......... *H04N 1/00554* (2013.01); *G03B 27/62* (2013.01); *G03G 21/1604* (2013.01); *H04N 1/00557* (2013.01); *H04N 1/10* (2013.01)

(58) Field of Classification Search
CPC .... H04N 1/0054; H04N 1/00557; H04N 1/10; G03B 27/62; G03B 321/604
(Continued)

(56) References Cited

U.S. PATENT DOCUMENTS 8,576,461 B2 * 11/2013 Nagasaka .............. H04N 1/203
358/474
8,587,840 B2 11/2013 Ito et al.
(Continued)

FOREIGN PATENT DOCUMENTS

JP 2011-205341 A 10/2011

*Primary Examiner* — Cheukfan Lee
(74) *Attorney, Agent, or Firm* — Studebaker & Brackett PC

(57) ABSTRACT

A reading device (100) includes a reading section (143), a casing (160), a cover section (110), a conveyance section (130), an interposed member (170), a controller (153), a cable (180), and a linking member (190). The casing (160) houses the reading section (143) therein. It is possible to place the cover section (110) on the casing (160). The conveyance section (130) is housed in the cover section (110) and conveys a sheet. The interposed member (170) is interposed between the cover section (110) and the casing (160). The controller (153) is housed in the casing (160) and controls the conveyance section (130). The cable (180) is connected to the controller (153), is also connected to the conveyance section (130), and transfers a control signal output by the controller (153) to the conveyance section (130). The linking member (190) is linked to the cover section (110) and is also linked to the casing (160).

8 Claims, 11 Drawing Sheets

(51) Int. Cl.
*G03B 27/62* (2006.01)
*G03G 21/16* (2006.01)
*H04N 1/10* (2006.01)

(58) Field of Classification Search
USPC .............. 358/474, 497, 496, 401, 501, 505; 399/380
See application file for complete search history.

(56) References Cited

U.S. PATENT DOCUMENTS

| | | | |
|---|---|---|---|
| 8,619,273 B2* | 12/2013 | Mukai | G03G 15/605 358/1.13 |
| 8,792,146 B2 | 7/2014 | Ito et al. | |
| 2011/0235140 A1 | 9/2011 | Ito et al. | |
| 2014/0071470 A1 | 3/2014 | Ito et al. | |
| 2015/0015920 A1* | 1/2015 | Muraoka | H04N 1/00554 358/400 |
| 2015/0189778 A1* | 7/2015 | Fujiwara | G03G 15/605 399/405 |
| 2016/0309048 A1* | 10/2016 | Yang | H04N 1/00795 |

* cited by examiner

READING DEVICE AND IMAGE FORMING APPARATUS

TECHNICAL FIELD

The present invention is related to a reading device and an image forming apparatus.

BACKGROUND ART

An image forming apparatus described in Patent Literature 1 includes an open and close section, a main body section, a flexible flat cable, and a guide section. The open and close section is linked to the main body section so as to be able to ascend and descend and to rotate. The open and close section is linked to the main body section by means of a hinge section. The flexible flat cable electrically connects a reading section and a control substrate to each other. The guide section guides the flexible flat cable so that the flexible flat cable follows the rotation or the ascent and descent of the open and close section.

CITATION LIST

Patent Literature

[Patent Literature 1]
Japanese Patent Application Laid-Open Publication No. 2011-205341

SUMMARY OF INVENTION

Technical Problem

There is a possibility, however, that the hinge section may come out of a guide hole formed in the main body section, and the open and close section (a cover section) may be detached from the main body section (a casing). Further, when the open and close section is detached from the main body section, the flexible flat cable may be detached from either or both the reading section and the control substrate.

It is an object of the present invention to provide a reading device and an image forming apparatus capable of preventing the cover section from being detached from the casing.

Solution to Problem

According to an aspect of the present invention, the reading device includes: a reading section, a casing, a cover section, a conveyance section, an interposed member, a controller, a cable, and a linking member. The reading section reads an image formed on a sheet. The casing houses the reading section therein. It is possible to place the cover section on the casing. The conveyance section is housed in the cover section and conveys the sheet. The interposed member is interposed between the cover section and the casing. The controller is housed in the casing and controls the conveyance section. The cable is connected to the controller, is also connected to the conveyance section, and transfers a control signal output by the controller to the conveyance section. The linking member is linked to the cover section and is also linked to the casing. The casing has a casing bore located therein for placement of the interposed member. The interposed member includes a first member and a second member. The first member is inserted in the casing bore and supported so as to be movable in a vertical direction. The second member is rotatably attached to the first member. The cover section is fixed to the second member.

According to another aspect of the present invention, an image forming apparatus includes the reading device and an image forming section. The image forming section forms an image on a sheet. The controller further controls the image forming section. The casing further houses the image forming section therein.

Advantageous Effects of Invention

According to the present invention, it is possible to prevent the cover section from being detached from the casing.

DESCRIPTION OF EMBODIMENTS

Figure 1:
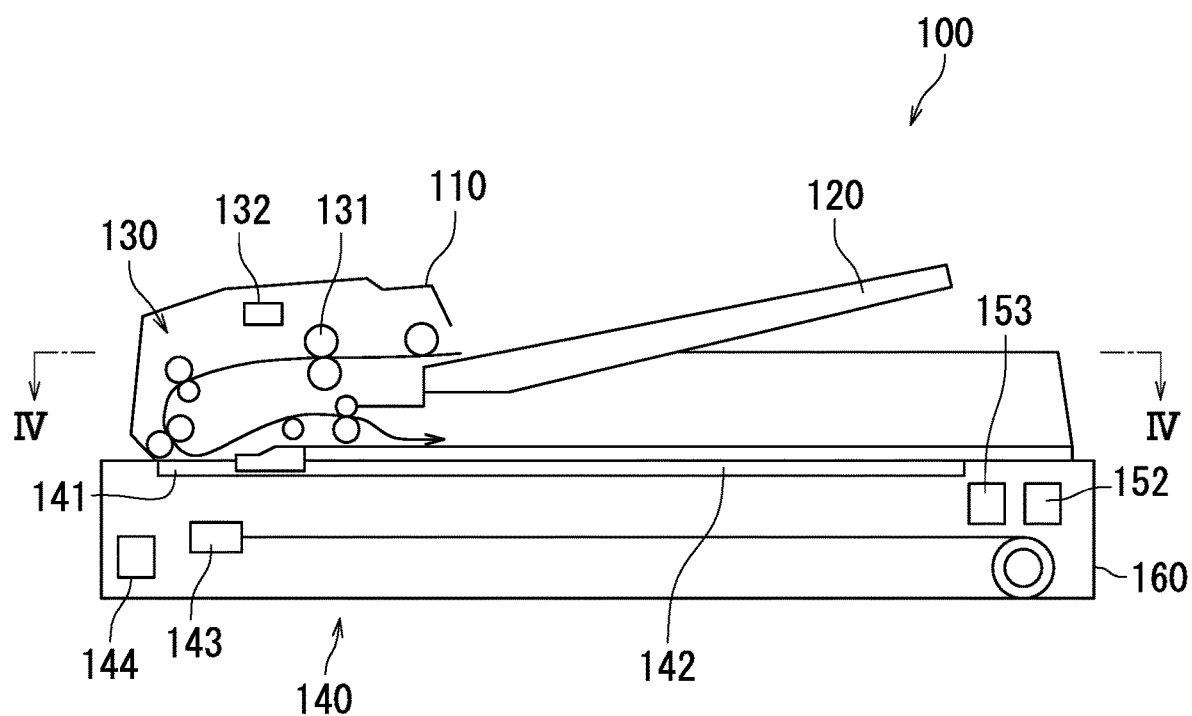
FIG. 1 is a schematic cross-sectional view of a reading device according to an embodiment of the present invention.

The following will describe embodiments of the present invention, with reference to drawings. Some of the elements in the drawings that are the same as each other or that correspond to each other will be referred to by using the same reference characters, and the explanations thereof will not be repeated.

First Embodiment

Figure 2A:
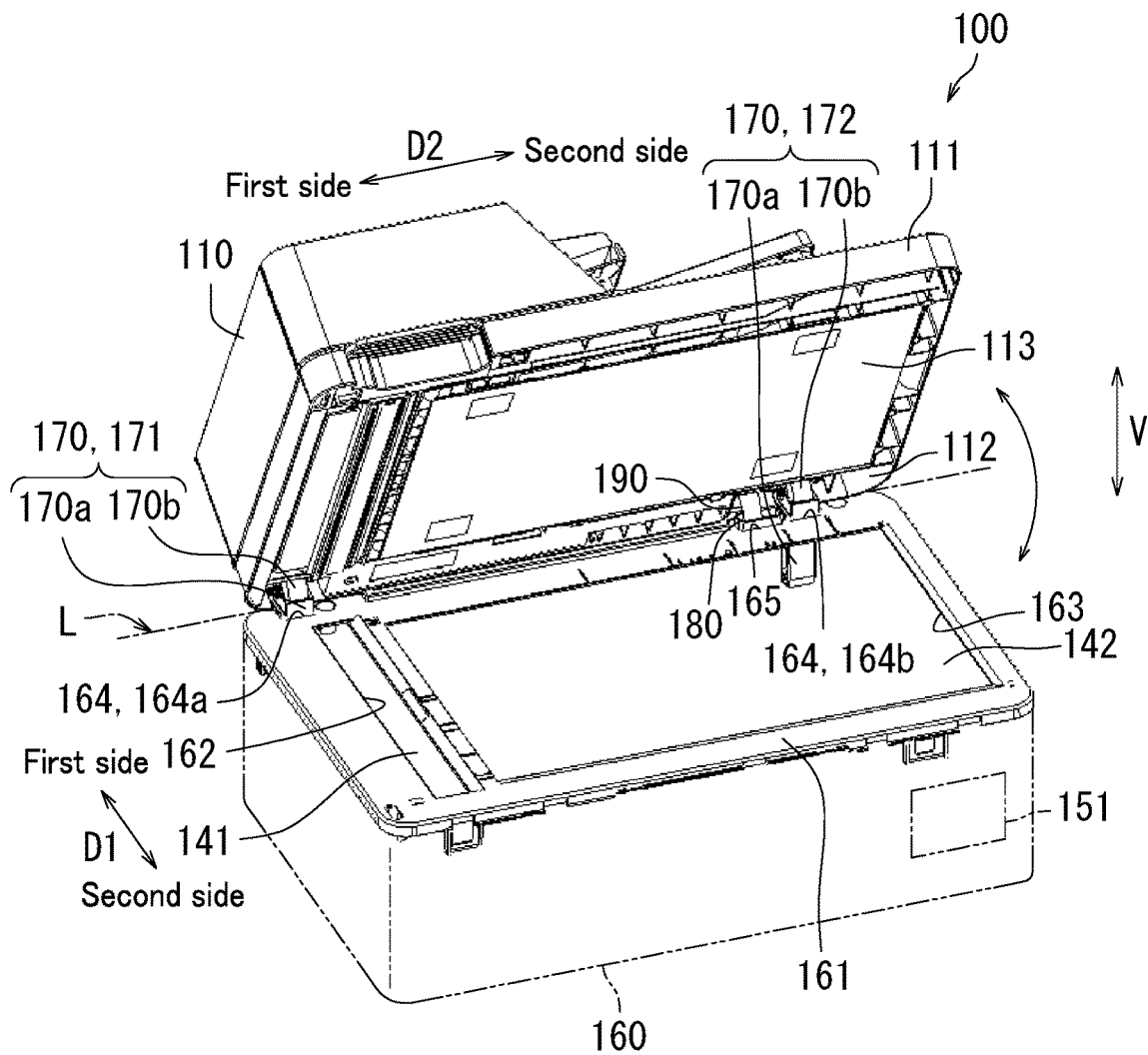
FIG. 2A is a perspective view of the reading device.

A reading device 100 representing a first embodiment of the present invention will be described with reference to FIGS. 1 to 3. FIG. 1 is a schematic cross-sectional view of the reading device 100. FIG. 2A is a perspective view of the reading device 100.

As illustrated in FIGS. 1 and 2A, the reading device 100 includes a cover section 110, a tray 120, and a conveyance section 130.

The cover section 110 has a hollow shape. The tray 120 is disposed on the outside of the cover section 110. The tray 120 is linked to the cover section 110. The tray 120 has one or more sheets loaded thereon. Each of the sheets may be, for example, sheets of plain paper, copy paper, recycled paper, thin paper, thick paper, glossy paper, or overhead projector (OHP) film. The cover section 110 is rotatably supported. More specifically, the cover section 110 is supported so as to be rotatable about a rotation axis L. The rotation axis L is the rotation axis of the cover section 110. The cover section 110 includes a rotation edge section 111 and a fulcrum edge section 112. The rotation edge section 111 is such an edge section of the cover section 110 that is positioned on a second side in terms of a first direction D1 while the cover section 110 is closed. The fulcrum edge section 112 is such an edge section of the cover section 110 that is positioned on a first side in terms of the first direction D1 while the cover section 110 is closed. The fulcrum edge section 112 is disposed along the rotation axis L. In the first embodiment, the rotation edge section 111 rotates about the fulcrum edge section 112 as a center. The rotation edge section 111 and the fulcrum edge section 112 each extend in a second direction D2. The second direction D2 is a direction parallel to the rotation axis L of the cover section 110. The first direction D1 is a direction perpendicular to the second direction D2. In the first embodiment, the first direction D1 and the second direction D2 are each a direction parallel to the horizontal direction.

The conveyance section 130 conveys the sheet. More specifically, the conveyance section 130 conveys the sheet from the tray 120. For example, the conveyance section 130 functions as an auto document feeder (ADF). The conveyance section 130 is housed in the cover section 110. The conveyance section 130 includes rollers 131 and a first driving section 132.

The rollers 131 include, for example, pickup rollers, separation rollers, conveyance rollers, and ejecting rollers. The pickup rollers forward the sheet loaded on the tray 120 to the inside of the cover section 110. The separation rollers forward the sheet while separating the sheet from one another. The conveyance rollers convey the sheet on the inside of the cover section 110. The ejecting rollers eject the sheet conveyed by the conveyance rollers, to the outside of the cover section 110.

The first driving section 132 is a driving source that rotates the rollers 131. The first driving section 132 rotates the rollers 131 so that the rollers 131 convey the sheet. More specifically, each of the pairs of rollers 131 conveys the sheet by rotating while having the sheet held therebetween. The first driving section 132 may be a motor, for example.

The reading device 100 further includes an image reading section 140.

The image reading section 140 includes an opposing section 141, a loading section 142, a reading section 143, and a second driving section 144.

The opposing section 141 is arranged in a location so as to be able to oppose the sheet conveyed by the conveyance section 130. The opposing section 141 is arranged on a conveyance path of the sheet conveyed by the conveyance section 130. The opposing section 141 may be a layer of contact glass, for example. It is possible to load any sheet on the loading section 142. The loading section 142 is arranged on the second side in terms of the second direction D2 with respect to the opposing section 141. The loading section 142 may be a layer of contact glass, for example.

The reading section 143 reads an image formed on any sheet. More specifically, the reading section 143 reads an image formed on each of the sheets conveyed by the conveyance section 130. While the cover section 110 is closed, the reading section 143 reads the image formed on a sheet conveyed by the conveyance section 130. Also, the reading section 143 reads an image formed on a sheet loaded on the loading section 142. "Reading an image" denotes obtaining image data representing the image by scanning the image.

For example, the reading section 143 may be a contact image sensor (CIS). For example, the reading section 143 includes a light emitting section such as a light emitting diode (LED) and an imaging section such as an image sensor. The reading section 143 scans the image formed on the sheet by employing the light emitting section and the imaging section.

The reading section 143 is arranged below the opposing section 141. Further, the reading section 143 is arranged below the loading section 142. The reading section 143 is supported so as to be movable in the second direction D2.

As a result of the conveyance section 130 conveying the sheet while the reading section 143 is positioned beneath the opposing section 141, the reading section 143 reads the image formed on the sheet. In this situation, while the sheet passes over the opposing section 141, the reading section 143 reads the image formed on the sheet.

As a result of the reading section 143 moving along the loading section 142 while the sheet is loaded on the loading section 142, the reading section 143 reads the image formed on the sheet. In this situation, while moving along the loading section 142, the reading section 143 reads the image formed on the sheet.

The second driving section 144 is a driving source that moves the reading section 143. The second driving section 144 may be a motor, for example.

The reading device 100 further includes an input section 151, storage 152, and a controller 153.

The input section 151 receives an instruction input to the reading device 100. Via the input section 151, for example, an instruction indicating that the image formed on the sheet should be read is input. The input section 151 includes, for example, either or both a touch panel and a group of operation keys.

The storage 152 includes a storage device. The storage device includes a main storage device (e.g., semiconductor memory) such as read only memory (ROM) and random access memory (RAM) and may further include an auxiliary storage device (e.g., a hard disk drive). Either or both the main storage device and the auxiliary storage device store therein various types of computer programs to be executed by the controller 153.

The controller 153 includes a processor such as a central processing unit (CPU) and a micro processing unit (MPU). The controller 153 controls each element of the reading device 100. More specifically, by executing the computer programs stored in one or more storage devices, the processor of the controller 153 controls the conveyance section 130 and the reading section 143. Even more specifically, in the first embodiment, the controller 153 controls the first driving section 132, the reading section 143, and the second driving section 144.

The controller 153 controls the first driving section 132 so that the first driving section 132 rotates the rollers 131 to convey the sheet. Further, the controller 153 controls the reading section 143 so that the reading section 143 reads the image formed on the sheet. Further, the controller 153 controls the second driving section 144 so that the second driving section 144 moves the reading section 143.

The reading device 100 further includes a casing 160. The casing 160 has a hollow shape. The casing 160 houses therein the image reading section 140, the storage 152, and the controller 153.

The casing 160 includes a ceiling section 161, a first opening section 162, and a second opening section 163. The ceiling section 161 is a plate-like member. The ceiling section 161 is arranged in a top section of the casing 160. The ceiling section 161, the opposing section 141, and the loading section 142 close the top section of the casing 160.

The first opening section 162 and the second opening section 163 are arranged in the top section of the casing 160. The first opening section 162 and the second opening section 163 are formed in the ceiling section 161. The first opening section 162 and the second opening section 163 allow communication between the outside of the casing 160 and the inside of the casing 160. The first opening section 162 and the second opening section 163 are spaced apart from each other in the second direction D2. The first opening section 162 is arranged with the opposing section 141. The first opening section 162 is closed by the opposing section 141. The second opening section 163 is arranged with the loading section 142. The second opening section 163 is closed by the loading section 142. As a result, the top surface of the opposing section 141 and the top surface of the loading section 142 are exposed to the outside of the casing 160 through the top section of the casing 160.

The casing 160 further includes a pair of casing bores 164 and a through hole 165. Each of the paired casing bores 164 and the through hole 165 is formed in the top section of the casing 160. Each of the paired casing bores 164 and the through hole 165 is formed in the ceiling section 161. The paired casing bores 164 and the through hole 165 allow communication between the outside of the casing 160 and the inside of the casing 160. Each of the paired casing bores 164 and the through hole 165 extends in the vertical direction V. The paired casing bores 164 and the through hole 165 are arranged in the edge section of the casing 160 positioned on the first side in terms of the first direction D1. The paired casing bores 164 and the through hole 165 are spaced apart from each other in the second direction D2. Further, the through hole 165 is arranged between the paired casing bores 164. In this situation, the paired casing bores 164 may each be a bottomless bore. In other words, the paired casing bores 164 may each allow communication between the inside of the casing bore 164 and the outside of the casing bore 164. Conversely, the paired casing bores 164 may each be a bore having a bottom. In other words, the paired casing bores 164 do not necessarily have to allow communication between the inside of the casing bores 164 and the outside of the casing bores 164.

Each of the paired casing bores 164 is located opposite to the cover section 110. More specifically, each of the paired casing bores 164 is located opposite to the fulcrum edge section 112 of the cover section 110. Further, the through hole 165 opposes the cover section 110. More specifically, the through hole 165 is located opposite to the fulcrum edge section 112 of the cover section 110.

The paired casing bores 164 include a first casing bore 164a and a second casing bore 164b. The first casing bore 164a is arranged on a first side of the casing 160 in terms of the second direction D2. The second casing bore 164b is arranged on a second side of the casing 160 in terms of the second direction D2.

The input section 151 is arranged on the second side of the casing 160 in terms of the first direction D1. Accordingly, a user operates the input section 151 from the second side of the casing 160 in terms of the first direction D1.

It is possible to place the cover section 110 on the casing 160. While the cover section 110 is placed on the casing 160, the cover section 110 is located opposite to the opposing section 141 and the loading section 142.

It is possible to place a sheet between the cover section 110 and the casing 160. While the cover section 110 is closed and the sheet is spaced between the cover section 110 and the casing 160, the reading section 143 reads an image formed on the sheet.

The reading device 100 further includes a pair of interposed members 170.

Figure 2B:
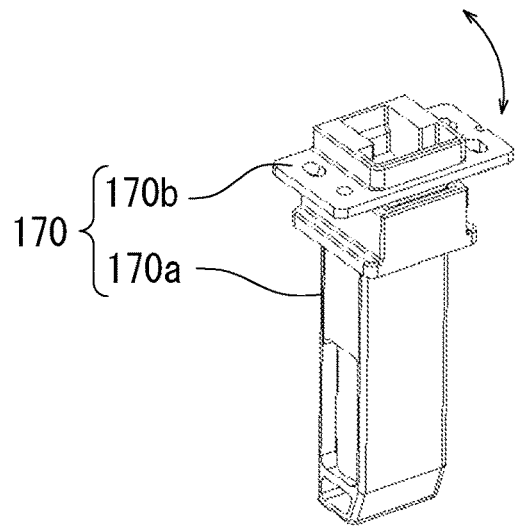
FIG. 2B is a perspective view of an interposed member.

Next, the interposed members 170 will be described with reference to FIGS. 2A, 2B, and 3. FIG. 2B is a perspective view of either of the interposed members 170. FIG. 3 is a drawing illustrating a manner to use the interposed members 170.

The interposed members 170 in the pair have the same structure as each other. In the following sections, a configuration of one of the interposed members 170 in the pair will be described.

As illustrated in FIGS. 2A and 2B, the interposed member 170 is interposed between the cover section 110 and the casing 160. The interposed member 170 is disposed in one of the casing bores 164. The interposed member 170 supports the cover section 110 so as to be rotatable and also supports the cover section 110 so as to be movable in the vertical direction V. More specifically, the interposed member 170 supports the cover section 110 so as to be rotatable about the casing 160 and also supports the cover section 110 so as to be movable in the vertical direction V with respect to the casing 160. The interposed member 170 functions as a fulcrum of the rotation of the cover section 110.

The interposed member 170 includes a first member 170a and a second member 170b. More specifically, each of the paired interposed members 170 includes a first member 170a and a second member 170b.

The first member 170a is inserted into the one of the casing bores 164. More specifically, a bottom section of the first member 170a is inserted into the casing bore 164. A top section of the first member 170a protrudes from the casing 160. The first member 170a slides along the casing bore 164. Accordingly, the first member 170a is supported so as to be movable in the vertical direction V. More specifically, the first member 170a is supported by the casing 160 so as to be movable in the vertical direction V.

The second member 170b is rotatably attached to the first member 170a. The rotation axis L of the cover section 110 is positioned in the location where the second member 170b is rotatably attached to the first member 170a. The second member 170b is rotatably attached to the top section of the first member 170a. Accordingly, the second member 170b is arranged above the casing 160. Further, the cover section 110 is fixed to the second member 170b. The second member 170b is fixed to the fulcrum edge section 112 of the cover section 110. Accordingly, the second member 170b and the cover section 110 integrally rotate with respect to the first member 170a. Further, the second member 170b and the cover section 110 integrally rotate with respect to the casing 160. At that time, the cover section 110 rotates about the second member 170b as a center.

The lower end of the first member 170*a* has such a size that it is possible to insert the first member 170*a* into the casing bore 164. More specifically, the size of the lower end of the first member 170*a* is smaller than the size of the opening of the casing bore 164. Accordingly, when the first member 170*a* descends after the lower end of the first member 170*a* is arranged above the opening of the casing bore 164, the lower end of the first member 170*a* is inserted into the casing bore 164 via the opening of the casing bore 164. As a result, it is possible to smoothly perform the procedure of inserting the first member 170*a* into the casing bore 164 and attaching the cover section 110 to the casing 160.

The paired interposed members 170 include a first interposed member 171 and a second interposed member 172. In the first embodiment, the first member 170*a* of the first interposed member 171 is inserted into the first casing bore 164*a*. The first member 170*a* of the second interposed member 172 is inserted into the second casing bore 164*b*.

When the cover section 110 rotates, the rotation edge section 111 of the cover section 110 moves close to or away from the casing 160. When the cover section 110 rotates, it is possible to open and close the cover section 110 with respect to the casing 160. While the cover section 110 is closed, the cover section 110 is placed on the casing 160. Also, while the cover section 110 is closed, a bottom surface 113 of the cover section 110 is located opposite to the opposing section 141 and the loading section 142, and the rotation edge section 111 is in contact with the ceiling section 161. On the contrary, while the cover section 110 is open, the rotation edge section 111 of the cover section 110 moves away upward in the vertical direction V with respect to the casing 160. As a result of the cover section 110 opening, it becomes possible to arrange a sheet between the cover section 110 and the casing 160. After that, the cover section 110 is closed, so that the sheet is scanned.

Figure 3:
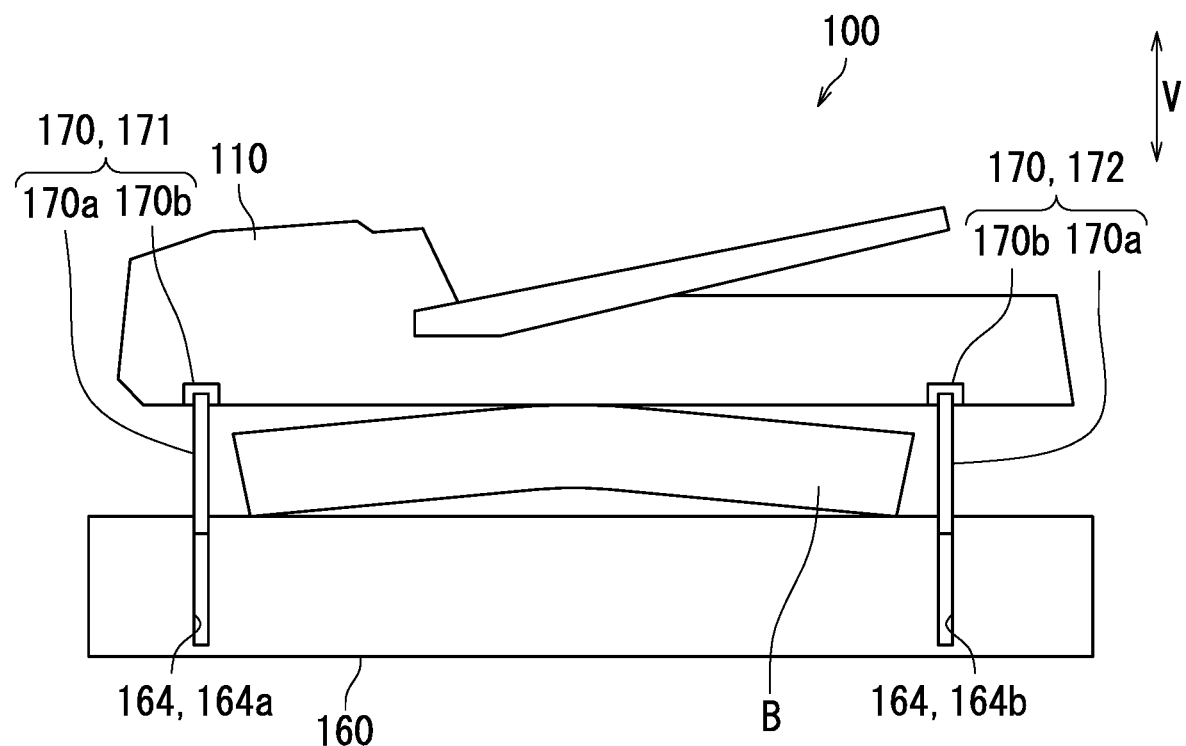
FIG. 3 is a drawing illustrating a manner to use interposed members.

As illustrated in FIG. 3, when the first members 170*a* move in the vertical direction V, the cover section 110 moves together with the first members 170*a*. At that time, the first members 170*a* slide along the casing bores 164. Accordingly, the cover section 110 is supported so as to be movable in the vertical direction V with respect to the casing 160. For example, when the cover section 110 moves upward in the vertical direction V with respect to the casing 160 so that the gap between the cover section 110 and the casing 160 becomes widened, it is possible to place a thick book B between the casing 160 and the cover section 110. As a result, it is possible to have the thick book B scanned and to have an image read from the book B by the reading section 143 housed in the casing 160.

The reading device 100 further includes a cable 180 and a linking member 190.

Figure 4A:
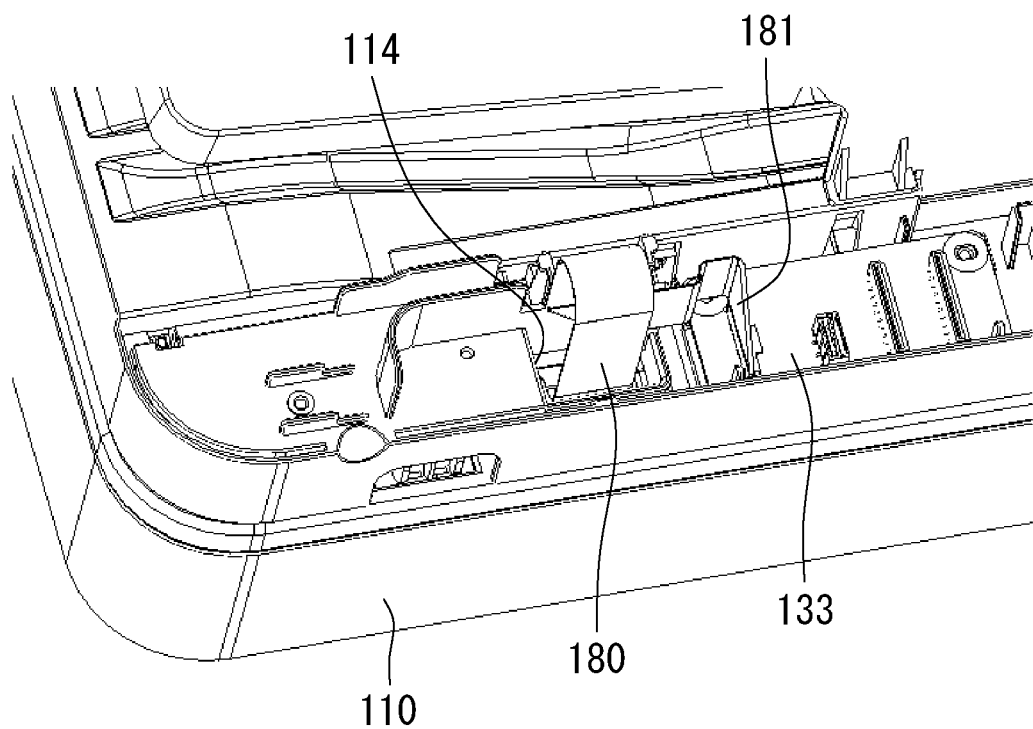
FIG. 4A is a perspective view taken at the IV-IV cross-section in FIG. 1.
Figure 5A:
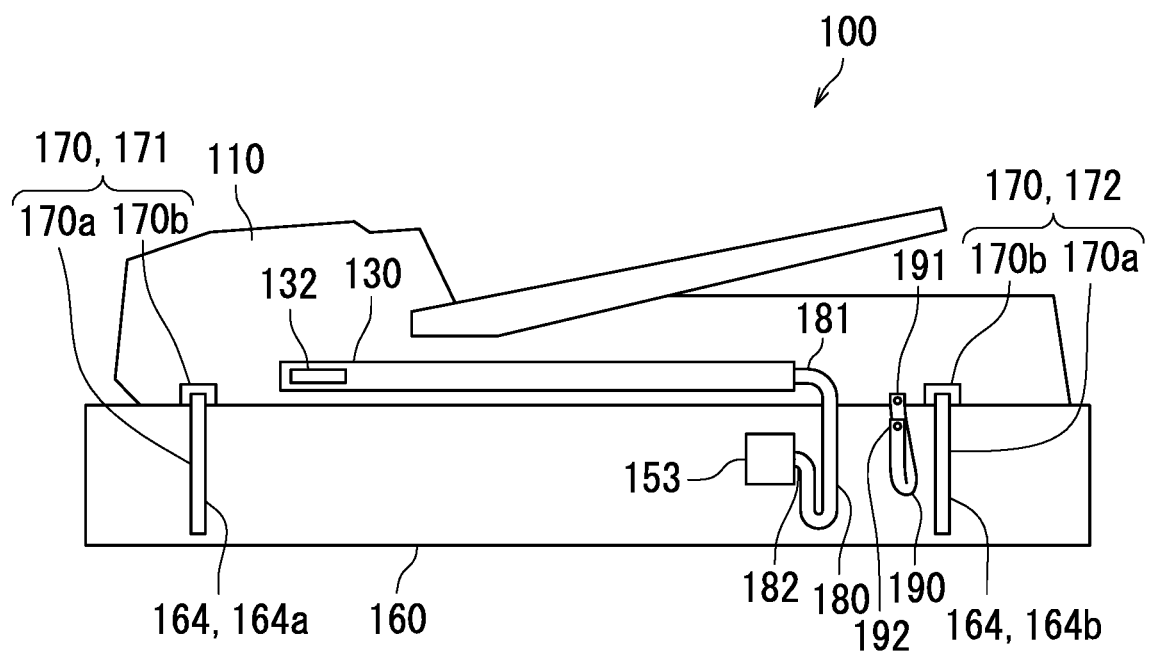
FIG. 5A is a schematic cross-sectional view illustrating a state in which a cover section of the reading device is closed.

Next, the cable 180 will be described with reference to FIGS. 4A and 5A. FIG. 4A is a perspective view taken at the IV-IV cross-section in FIG. 1. The linking member 190 is omitted from FIG. 4A. FIG. 5A is a schematic cross-sectional view illustrating a state in which the cover section 110 is closed.

As illustrated in FIGS. 4A and 5A, the cable 180 electrically connects the conveyance section 130 and the controller 153 to each other. The cable 180 is connected to the conveyance section 130 and to the controller 153. More specifically, the cable 180 is connected to the first driving section 132 of the conveyance section 130 and to the controller 153. For example, the cable 180 is connected to the conveyance section 130 via a substrate 133. Further, the cable 180 transfers a control signal output by the controller 153 to the conveyance section 130 (the first driving section 132). The control signal is, for example, a signal indicating that the first driving section 132 should be operated so that the conveyance section 130 conveys a sheet. In the first embodiment, the cable 180 is a flat cable. Further, the cable 180 is flexible. In other words, the cable 180 includes a flexible member. The cable 180 has, for example, a structure in which a plurality of conductors each covered by electrically-insulative coating are integrally formed in a belt-like shape.

The cable 180 is connected to the conveyance section 130 on the inside of the cover section 110. More specifically, a first end section 181 of the cable 180 enters the inside of the cover section 110 via a hole 114 formed in the cover section 110 and is connected to the conveyance section 130 on the inside of the cover section 110.

The hole 114 in the cover section 110 is formed in a bottom section of the cover section 110. The hole 114 formed in the cover section 110 allows communication between the inside of the cover section 110 and the outside of the cover section 110. Further, the hole 114 formed in the cover section 110 is located opposite to the through hole 165 formed in the casing 160.

The cable 180 is connected to the controller 153 on the inside of the casing 160. More specifically, a second end section 182 of the cable 180 enters the inside of the casing 160 via the through hole 165 (see FIG. 2A) and is connected to the controller 153 on the inside of the casing 160.

As a result of the cable 180 being connected to the conveyance section 130 and to the controller 153, it is possible to transfer the control signal output by the controller 153 to the conveyance section 130 via the cable 180.

The cable 180 is arranged in the fulcrum edge section 112 of the cover section 110 (see FIG. 2A). Further, the cable 180 is arranged in a position apart from the interposed members 170 with intervals in the extending direction of the rotation axis L of the second member 170*b*. In the first embodiment, the extending direction of the rotation axis L is the second direction D2. Further, in the first embodiment, the cable 180 is arranged next to the second interposed member 172.

Figure 4B:
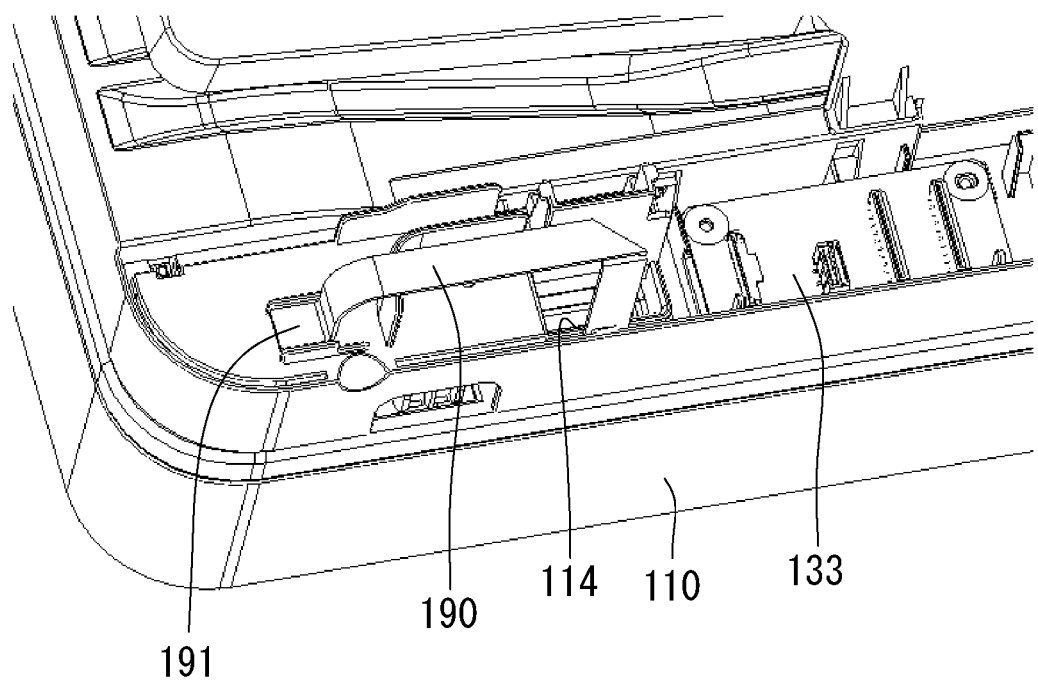
FIG. 4B is another perspective view taken at the IV-IV cross-section in FIG. 1.

Next, the linking member 190 will be described with reference to FIGS. 4B and 5A. FIG. 4B is another view taken at the IV-IV cross-section in FIG. 1. The cable 180 is omitted from FIG. 4B.

As illustrated in FIGS. 4B and 5A, the linking member 190 is linked to the cover section 110 and is also linked to the casing 160. Accordingly, the cover section 110 and the casing 160 are linked to each other via the linking member 190.

The linking member 190 has a belt-like shape. The linking member 190 is arranged so as to be positioned adjacent to the cable 180.

The linking member 190 is linked to the cover section 110 on the inside of the cover section 110. More specifically, a first end section 191 of the linking member 190 enters the inside of the cover section 110 via the hole 114 formed in the cover section 110 and is linked to the cover section 110 on the inside of the cover section 110. For example, the linking member 190 is linked to the cover section 110 by means of a screw. The expression "the linking member 190 is linked to the cover section 110" does not only mean a situation where the linking member 190 is directly linked to the cover section 110, but also includes a situation where the linking member 190 is indirectly linked to the cover section 110. When the linking member 190 is indirectly linked to the cover section 110, for example, the linking member 190 is linked to a member supported on the cover section 110.

The linking member 190 is linked to the casing 160 on the inside of the casing 160. More specifically, a second end section 192 of the linking member 190 enters the inside of the casing 160 via the through hole 165 (see FIG. 2A) and is linked to the casing 160 on the inside of the casing 160. For example, the linking member 190 is linked to the casing 160 by means of a screw. The expression "the linking member 190 is linked to the casing 160" does not only mean a situation where the linking member 190 is directly linked to the casing 160, but also includes a situation where the linking member 190 is indirectly linked to the casing 160. When the linking member 190 is indirectly linked to the casing 160, for example, the linking member 190 is linked to a member supported on the casing 160.

As a result of the linking member 190 being linked to the casing 160 on the inside of the casing 160, it is possible to cover the linking member 190 with the casing 160. As a result, it is possible to prevent the linking member 190 from being damaged.

The linking member 190 is arranged in the fulcrum edge section 112 of the cover section 110. Further, the linking member 190 is arranged in a position apart from the interposed members 170 with intervals in the extending direction of the rotation axis L (see FIG. 2A) of the second member 170b. Accordingly, the linking member 190 is arranged in the fulcrum edge section 112 of the cover section 110. As a result, when the cover section 110 is opened or closed, it is possible to prevent the linking member 190 from being obstructive. In the first embodiment, the linking member 190 is arranged next to the second interposed member 172.

The linking member 190 is flexible. Further, the linking member 190 has electrical conductivity. In other words, the linking member 190 includes a flexible member and also includes a member having electrical conductivity. For example, the linking member 190 is constituted by a member made from metal. For example, the linking member 190 may contain copper. For example, the linking member 190 may have a structure in which a member made from metal and having electrical conductivity is fixed to a member made from resin.

Because the linking member 190 is flexible, it is possible to smoothly perform operation of opening the cover section 110, operation of closing the cover section 110, and operation of moving the cover section 110 each in the vertical direction V.

Further, because the linking member 190 has electrical conductivity, it is possible to have the conveyance section 130 grounded to the casing 160 via the linking member 190. As a result, it is possible to prevent the conveyance section 130 from having static electricity.

As described above with reference to FIGS. 4A, 4B, and 5A, the linking member 190 is linked to the cover section 110 and is also linked to the casing 160. Accordingly, when the cover section 110 is opened and the cover section 110 is detached from the casing 160, the linking member 190 becomes taut and is able to restrain the opening motion of the cover section 110. As a result, it is possible to prevent the cover section 110 from being detached from the casing 160. In this situation, the expression "the linking member 190 becomes taut" means that the linking member 190 is stretched tight and is unable to extend further. Further, the expression "the cover section 110 is detached from the casing 160" means that at least one of the first members 170a comes out of the casing bore 164.

Figure 5B:
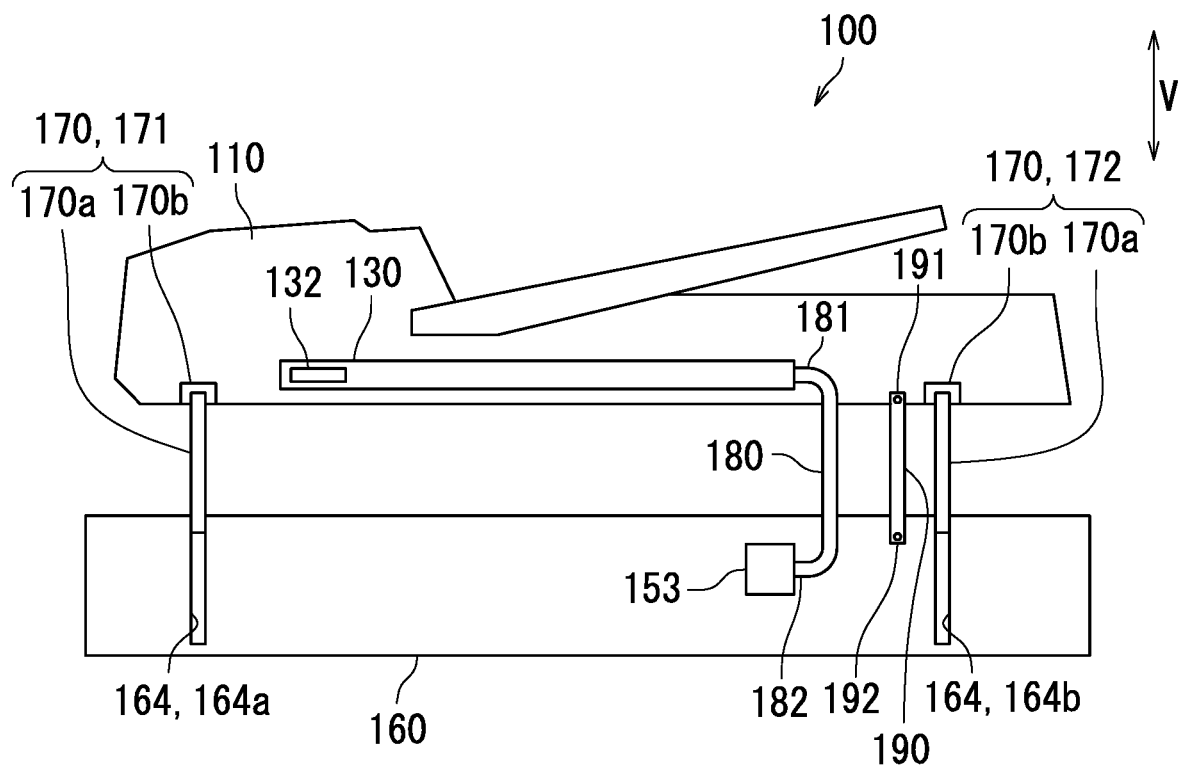
FIG. 5B is a schematic cross-sectional view illustrating a state in which the cover section of the reading device has moved upward in a vertical direction V.

Next, dimensions of the interposed members 170, the cable 180, and the linking member 190 will be explained, with reference to FIGS. 5A and 5B. FIG. 5B is a schematic cross-sectional view illustrating a state in which the cover section 110 has moved upward in the vertical direction V.

As illustrated in FIG. 5A, while the cover section 110 is closed, the first members 170a are inserted in the casing bores 164. Further, while the cover section 110 is closed, the cable 180 and the linking member 190 are each slack.

As illustrated in FIG. 5B, when the cover section 110 has moved upward in the vertical direction V, the linking member 190 becomes taut while the state in which the first members 170a are inserted in the casing bores 164 is maintained. When the linking member 190 is taut, the cover section 110 is restrained from moving upward in the vertical direction V. As a result, it is possible to prevent the first members 170a from coming out of the casing bores 164, and it is therefore possible to prevent the cover section 110 from being detached from the casing 160. In this situation, the expression "the first members 170a come out of the casing bores 164" means, in other words, that the first members 170a are positioned apart from the casing 160 and are detached from the casing 160.

Further, when the cover section 110 has moved upward in the vertical direction V, the linking member 190 becomes taut while the cable 180 is slack. In other words, before the cable 180 becomes taut, the linking member 190 becomes taut. Accordingly, the cover section 110 is restrained from further moving upward, and the cable 180 is restrained from becoming taut. As a result, it is possible to prevent the cable 180 from being detached from either or both the conveyance section 130 (the substrate 133) and the controller 153. The length of the linking member 190 being taut is shorter than the length of the cable 180 being taut and is such a length that prevents the first members 170a from being positioned apart from the casing 160.

Second Embodiment

Figure 6:
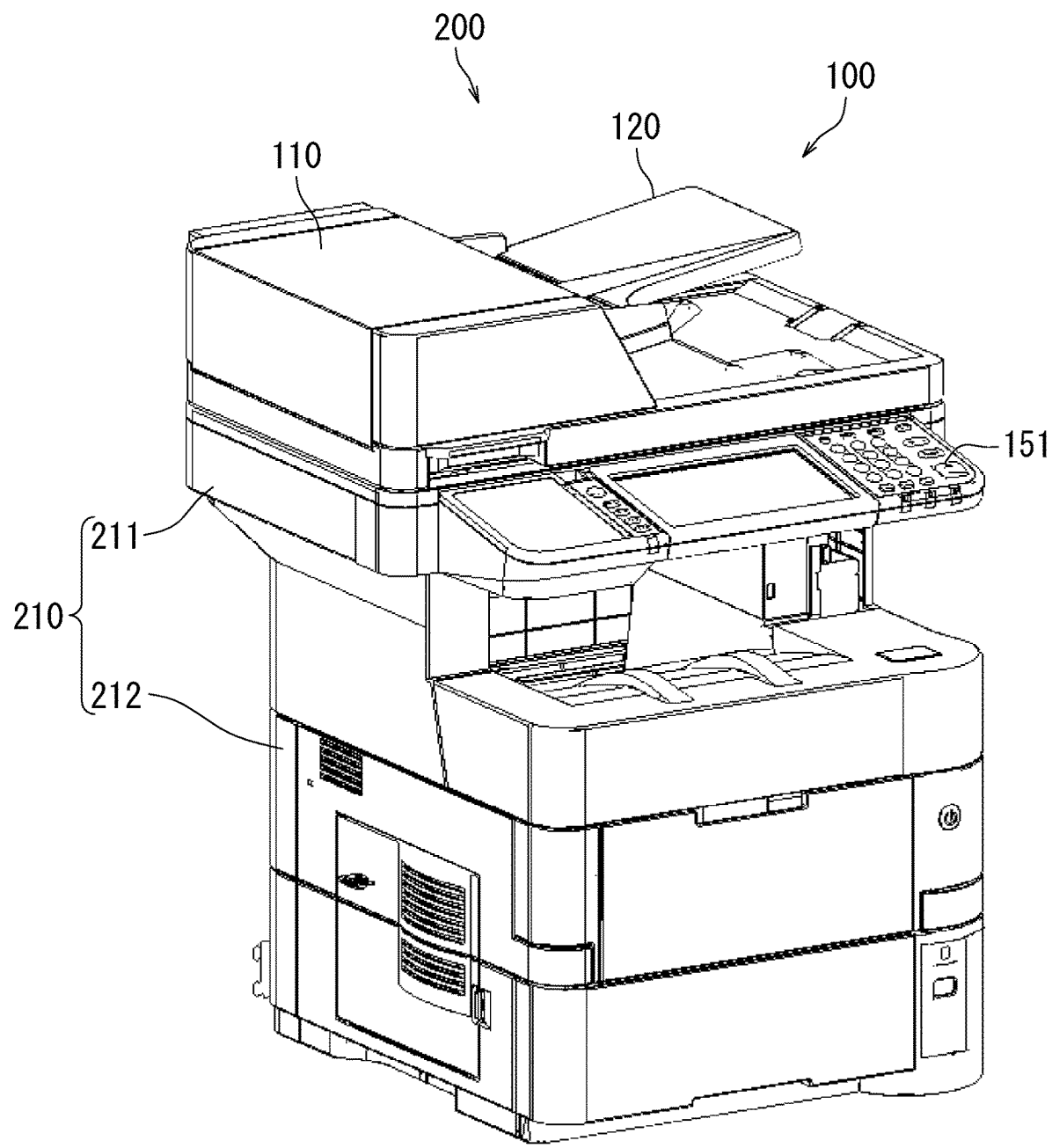
FIG. 6 is a perspective view of an image forming apparatus.
Figure 7:
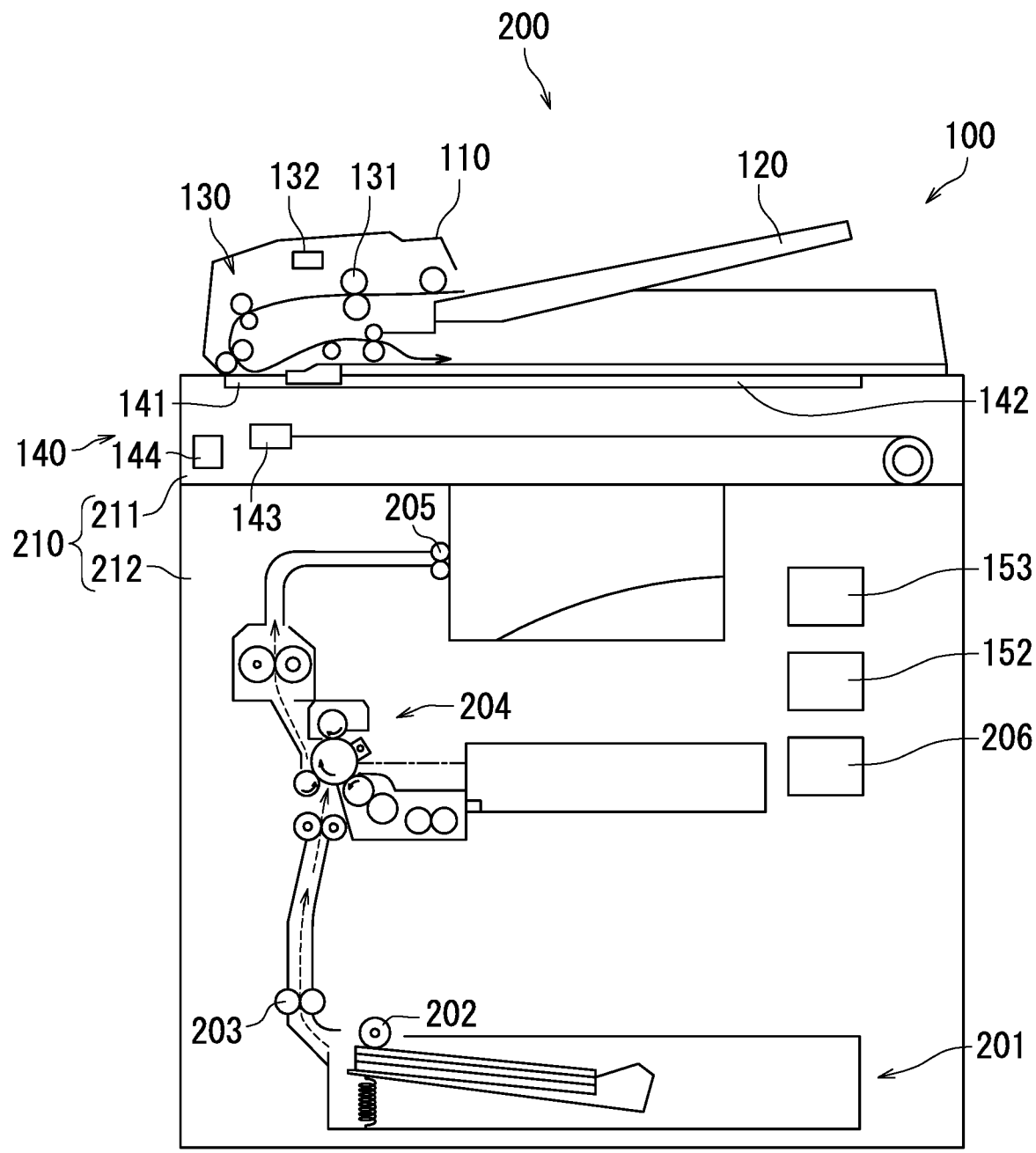
FIG. 7 is a schematic cross-sectional view of the image forming apparatus.

An image forming apparatus 200 representing a second embodiment of the present invention will be described with reference to FIGS. 6 and 7. FIG. 6 is a perspective view of the image forming apparatus 200. FIG. 7 is a schematic cross-sectional view of the image forming apparatus 200. The image forming apparatus 200 according to the second embodiment is obtained by adding an image forming function to the reading device 100 of the first embodiment.

As illustrated in FIGS. 6 and 7, the image forming apparatus 200 includes the reading device 100, a cassette 201, a feed roller 202, conveyance rollers 203, an image forming section 204, ejection rollers 205, a third driving section 206, and a casing 210.

The cassette 201 houses one or more sheets therein. The feed roller 202 feeds the sheets in the cassette 201. The conveyance rollers 203 forward each of the sheets conveyed from the feed roller 202 to the image forming section 204.

The image forming section 204 forms an image on the sheet. More specifically, the image forming section 204 forms the image on one of the sheets supplied thereto from the cassette 201. The image is, more specifically, a toner image. The image forming section 204 includes a photosensitive drum, a charger, a light exposing section, a developing section, and a transfer section, a cleaner, and a charge eliminating section. The image is formed on the sheet by the photosensitive drum, the charger, the light exposing section, the developing section, and the transfer section. The cleaner removes toner remaining on the surface of the photosensitive drum. The charge eliminating section eliminates electric charges remaining on the surface of the photosensitive drum. The image forming section 204 forms the image on the sheet and subsequently forwards the sheet to a fixing section. The fixing section fixed the image onto the sheet by applying heat and pressure.

The ejection rollers 205 ejects the sheet that has passed through the image forming section 204 out of the casing 210.

The third driving section 206 is a driving source that rotates the feed roller 202, the conveyance rollers 203, and the ejection rollers 205. The third driving section 206 conveys the sheet by rotating the feed roller 202, the conveyance rollers 203, and the ejection rollers 205. The third driving section 206 is a motor, for example.

The casing 210 has a hollow shape. The casing 210 houses therein the image reading section 140, the storage 152, the controller 153, the cassette 201, the feed roller 202, the conveyance rollers 203, the image forming section 204, the ejection rollers 205, and the third driving section 206. The linking member 190 is linked to the casing 210.

The casing 210 includes a first casing section 211 and a second casing section 212.

The first casing section 211 functions as the casing 160 of the first embodiment. The first casing section 211 houses the image reading section 140 therein. It is possible to place the cover section 110 on the first casing section 211.

The second casing section 212 houses therein the storage 152, the controller 153, the cassette 201, the feed roller 202, the conveyance rollers 203, the image forming section 204, the ejection rollers 205, and the third driving section 206. In the first embodiment, the casing 160 corresponding to the first casing section 211 houses therein the storage 152 and the controller 153. In contrast, in the second embodiment, the second casing section 212 houses therein the storage 152 and the controller 153.

The first casing section 211 is placed on the second casing section 212. The first casing section 211 is secured to the second casing section 212.

The controller 153 controls each element of the image forming apparatus 200. The controller 153 controls the conveyance section 130 (the first driving section 132), the reading section 143, the second driving section 144, the image forming section 204, and the third driving section 206.

Figure 8:
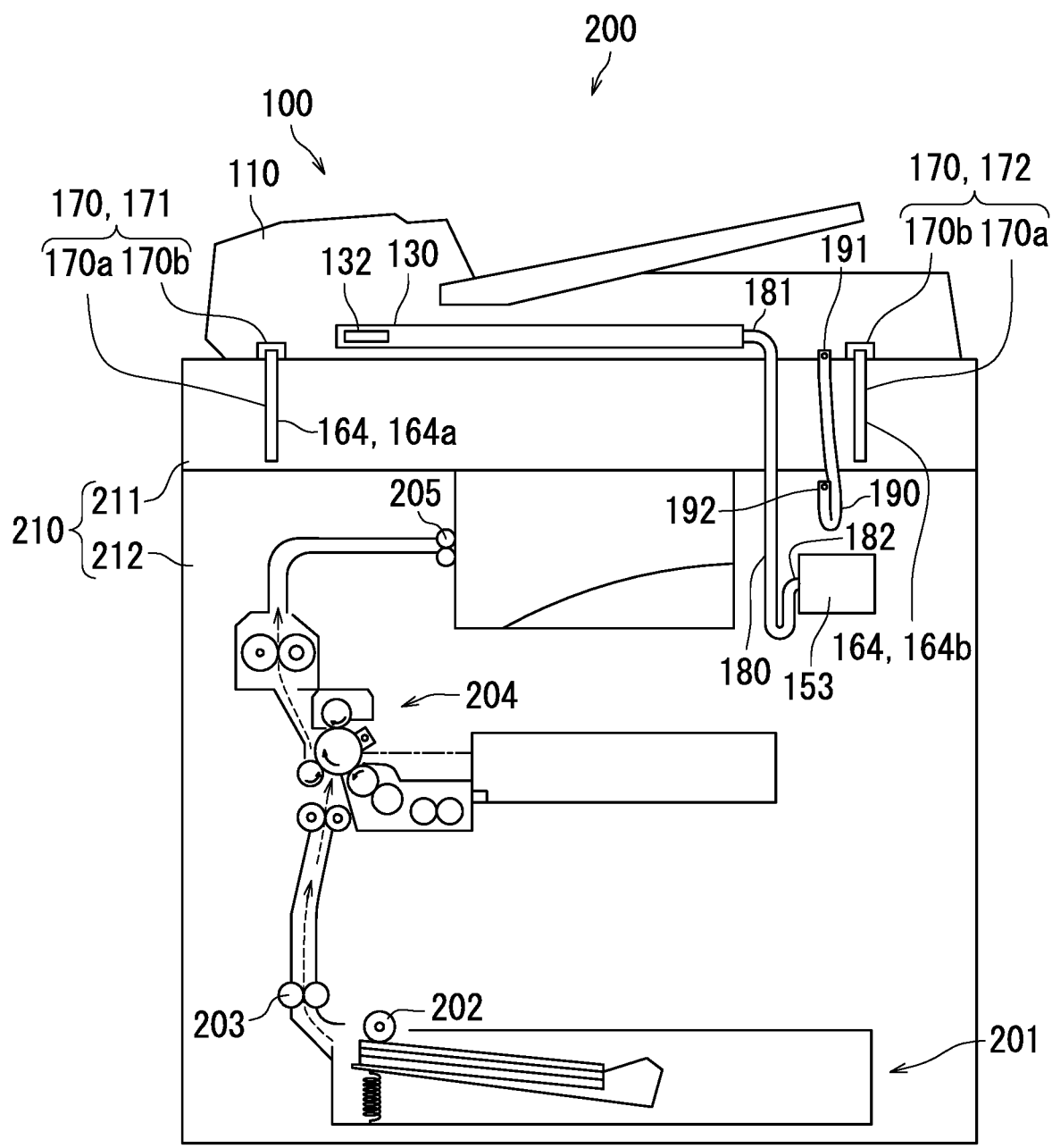
FIG. 8 is a schematic cross-sectional view illustrating a state in which a cover section of the image forming apparatus is closed.

Next, the location in which the cable 180 is arranged and the location in which the linking member 190 is arranged will be explained with reference to FIG. 8. FIG. 8 is a schematic cross-sectional view illustrating a state in which the cover section 110 is closed.

As illustrated in FIG. 8, the second end section 182 of the cable 180 is connected to the controller 153 on the inside of the second casing section 212. More specifically, the second end section 182 of the cable 180 enters the inside of the second casing section 212 via the first casing section 211 and is connected to the controller 153 on the inside of the second casing section 212.

The linking member 190 is linked to the second casing section 212. The linking member 190 is linked to the second casing section 212 on the inside of the second casing section 212. More specifically, the second end section 192 of the linking member 190 enters the inside of the second casing section 212 via the first casing section 211 and is linked to the second casing section 212 on the inside of the second casing section 212. In this situation, the expression "the linking member 190 is linked to the second casing section 212" does not only mean a situation where the linking member 190 is directly linked to the second casing section 212, but also includes a situation where the linking member 190 is indirectly linked to the second casing section 212. When the linking member 190 is indirectly linked to the second casing section 212, for example, the linking member 190 is linked to a member supported on the second casing section 212.

Figure 9:
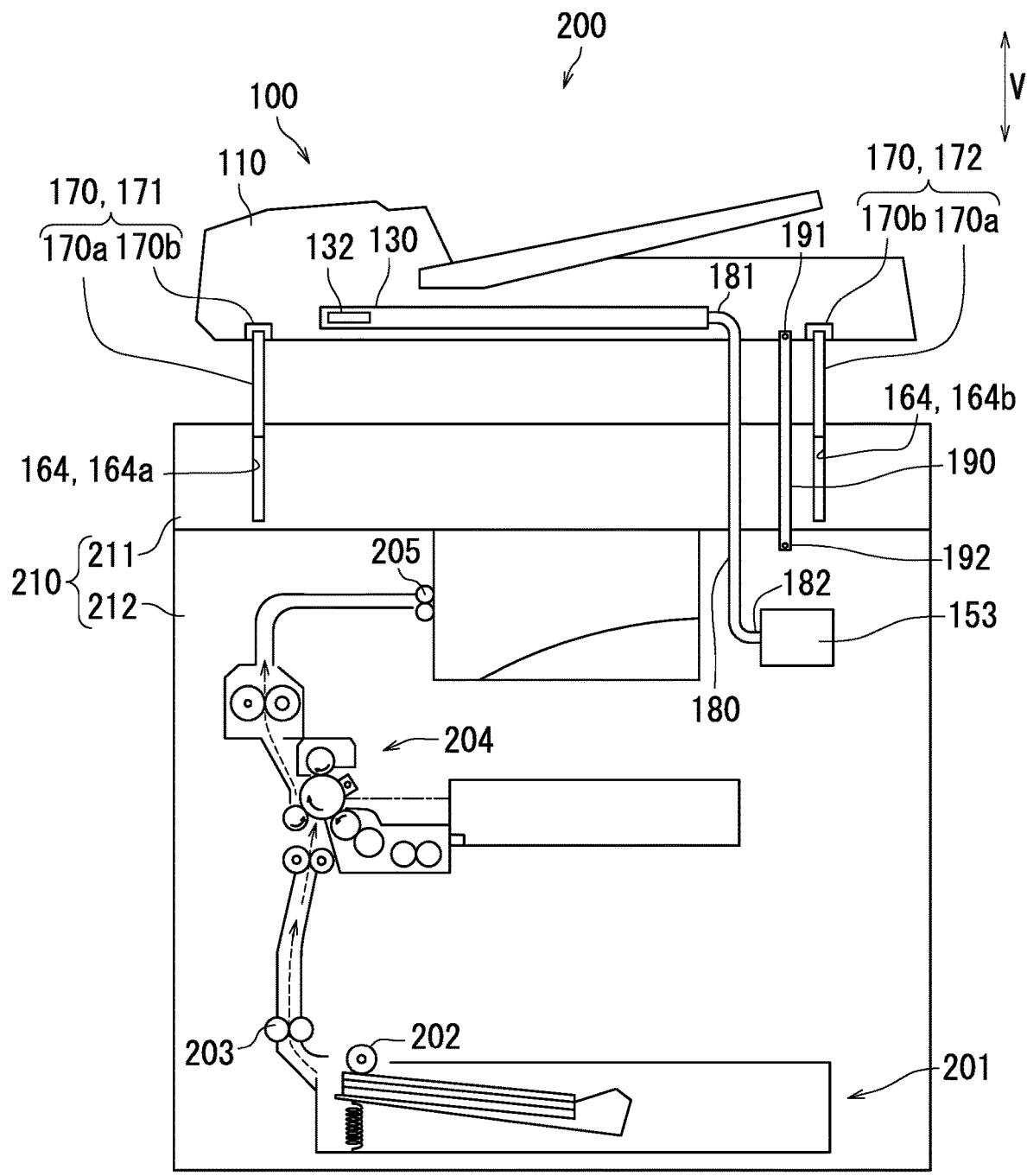
FIG. 9 is a schematic cross-sectional view illustrating a state in which the cover section of the image forming apparatus has moved upward in a vertical direction.

Next, dimensions of the interposed members 170, the cable 180, and the linking member 190 will be explained, with reference to FIGS. 8 and 9. FIG. 9 is a schematic cross-sectional view illustrating a state in which the cover section 110 has moved upward in the vertical direction V.

As illustrated in FIG. 8, the pair of interposed members 170 is interposed between the first casing section 211 and the cover section 110. While the cover section 110 is closed, the first members 170a are inserted in the casing bores 164. Further, while the cover section 110 is closed, the cable 180 and the linking member 190 are each slack.

As illustrated in FIG. 9, when the cover section 110 has moved upward in the vertical direction V, the linking member 190 becomes taut while the state in which the first members 170a are inserted in the casing bores 164 is maintained. As a result, it is possible to prevent the first members 170a from coming out of the casing bores 164, and it is therefore possible to prevent the cover section 110 from being detached from the casing 210.

Further, when the cover section 110 has moved upward in the vertical direction V, the linking member 190 becomes taut while the cable 180 is slack. Accordingly, the cover section 110 is restrained from further moving upward, and the cable 180 is restrained from becoming taut. As a result, it is possible to prevent the cable 180 from being detached from either or both the conveyance section 130 (the substrate 133) and the controller 153.

Certain embodiments of the present invention have thus been described with reference to the drawings (FIGS. 1 to 9). It should be noted, however, that the present invention is not limited to the embodiments described above. It is possible to carry out the present invention in various ways (e.g., (1) to (5)) without departing from the gist thereof. Further, it is possible to arrive at various inventions by combining together two or more of the elements of configuration disclosed in the above embodiments as appropriate. For example, one or more of the elements of configuration described in the embodiments may be omitted. To enhance legibility, the drawings are schematically illustrated while a focus is placed on the elements of configuration thereof. The quantity and the like of the elements of configuration illustrated in the drawings may be different from those in actuality for the sake of convenience in the preparation of the drawings. Further, the elements of configuration described in the above embodiments are merely examples, and are not particularly limited. It is possible to apply different variations thereto without substantially departing from advantageous effects of the present invention.

(1) In the second embodiment, the image forming section 204 forms a toner image on a sheet; however, the present invention is not limited to this example. It is sufficient when the image forming section 204 has a function of forming an image on a sheet. For example, the image forming section 204 may form an ink image on a sheet. In other words, the image forming section 204 may be an inkjet-type image forming section.

(2) In the first and the second embodiments, the single liking member, namely the linking member 190, is provided; however, the present invention is not limited to this example. A plurality of linking members 190 may be provided. In that situation, in the first embodiment, each of the plurality of linking members 190 is linked to the cover section 110 and is also linked to the casing 160. Further, in that situation, in the second embodiment, each of the plurality of linking members 190 is linked to the cover section 110 and is also linked to the casing 210.

(3) In the first and the second embodiments, a reading section may be housed in the cover section 110 of the reading device 100. Hereinafter, the reading section housed in the cover section 110 will be referred to as a housed reading section. In that situation, the housed reading section reads an image from a sheet conveyed by the conveyance section 130. Further, in that situation, it is also acceptable to configure the housed reading section to read an image from one side of a sheet and to configure the reading section 143 to read an image from the other side of the sheet. In that situation, the cable 180 is further connected to the housed reading section. Further, image data read by the housed reading section is transferred to the controller 153 via the cable 180. Further, the controller 153 transfers a control signal used for controlling the housed reading section to the housed reading section via the cable 180.

(4) In the first and the second embodiments, the linking member 190 is flexible and also has electrical conductivity; however, the present invention is not limited to this example. It is sufficient when the linking member 190 has enough strength not to break while the linking member 190 is taut. Further, for example, the linking member 190 does not necessarily need to have electrical conductivity while being flexible. In that situation, the linking member 190 may be made from resin.

(5) The image forming apparatus 200 according to the second embodiment illustrated in FIG. 8 may also be configured to have any configuration of (i), (ii), and (iii) described below.

(i) Similarly to the second embodiment, the linking member 190 is linked to the second casing section 212. However, unlike in the second embodiment, the controller 153 is housed in the first casing section 211. In that situation, the second end section 182 of the cable 180 is connected to the controller 153 on the inside of the first casing section 211.

Figure 10:
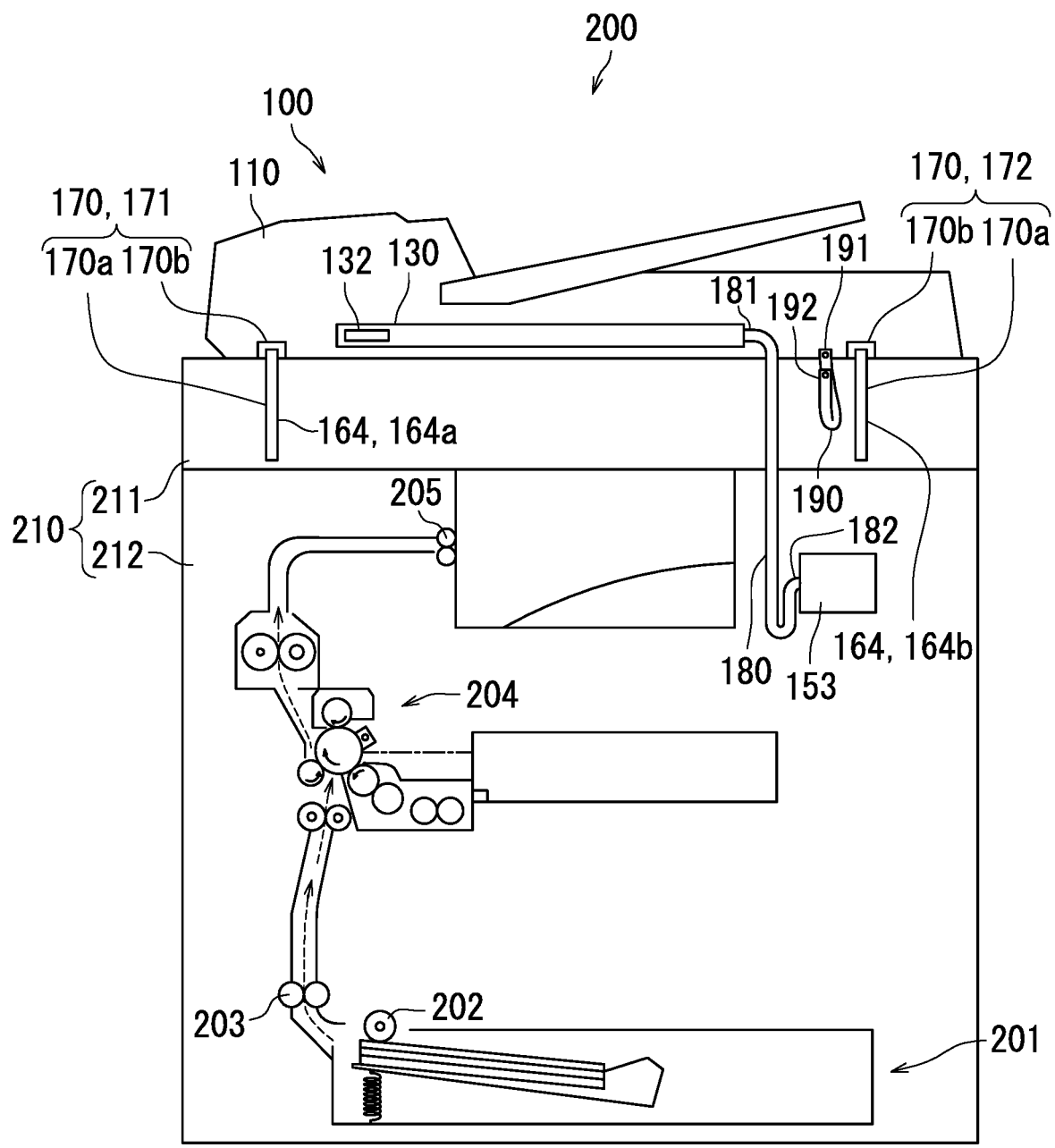
FIG. 10 is a schematic cross-sectional view illustrating a state in which a cover section is closed in a variation of the image forming apparatus.
Figure 11:
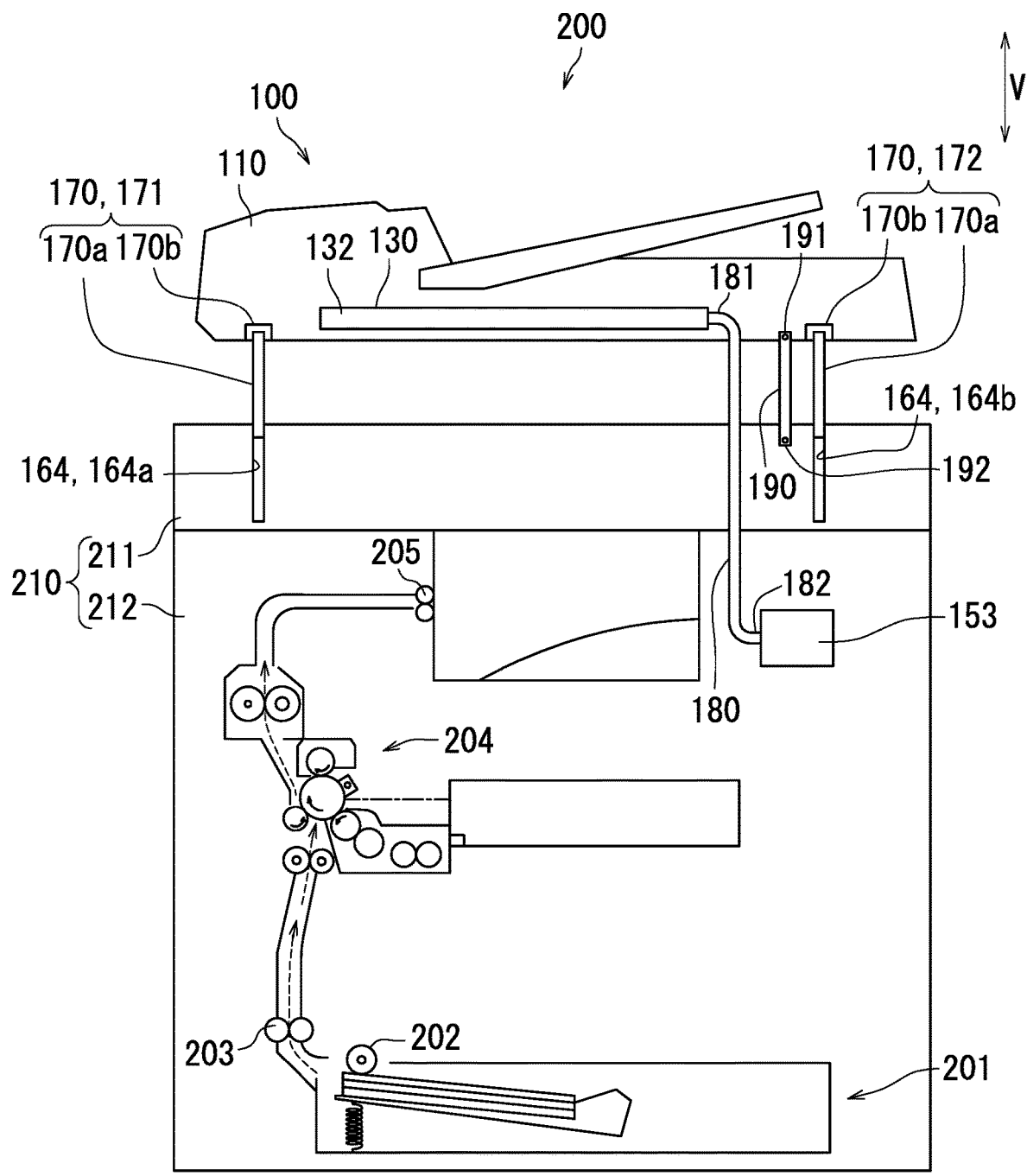
FIG. 11 is a schematic cross-sectional view illustrating a state in which the cover section in the variation of the image forming apparatus has moved upward in the vertical direction V.

(ii) FIG. 10 is a schematic cross-sectional view illustrating a state in which the cover section 110 is closed. FIG. 11 is a schematic cross-sectional view illustrating a state in which the cover section 110 has moved upward in the vertical direction V. As illustrated in FIGS. 10 and 11, similarly to the second embodiment, the controller 153 is housed in the second casing section 212. However, unlike in the second embodiment, the linking member 190 is linked to the first casing section 211. In that situation, the linking member 190 is linked to the first casing section 211 on the inside of the first casing section 211.

(iii) Unlike in the second embodiment, the controller 153 is housed in the first casing section 211. Further, unlike in the second embodiment, the linking member 190 is linked to the first casing section 211. In that situation, the second end section 182 of the cable 180 is connected to the controller 153 on the inside of the first casing section 211. Further, the linking member 190 is linked to the first casing section 211 on the inside of the first casing section 211.

In any of the configurations (i), (ii), and (iii) above, when the cover section 110 has moved upward in the vertical direction V, the linking member 190 becomes taut while the state in which the first members 170a are inserted in the casing bores 164 is maintained. As a result, it is possible to prevent the first members 170a from coming out of the casing bores 164, and it is therefore possible to prevent the cover section 110 from being detached from the casing 160. Further, when the cover section 110 has moved upward in the vertical direction V, the linking member 190 becomes taut while the cable 180 is slack. As a result, it is possible to prevent the cable 180 from being detached from either of both the conveyance section 130 (the substrate 133) and the controller 153.

INDUSTRIAL APPLICABILITY

The present invention is applicable to the fields of reading devices and image forming apparatuses.

The invention claimed is:
1. A reading device comprising:
an image sensor configured to read an image formed on a sheet;
a casing housing the image sensor therein;
a cover section capable of being placed on the casing;
a conveyance section housed in the cover section and configured to convey the sheet;
an interposed member interposed between the cover section and the casing;
a controller housed in the casing and configured to control the conveyance section;
a cable that is connected to the controller, is also connected to the conveyance section, and is configured to transfer a control signal output by the controller to the conveyance section; and
a linking member that is linked to the cover section and is also linked to the casing, wherein
the casing has a casing bore located therein for placement of the interposed member,
the interposed member includes a first member inserted in the casing bore and supported so as to be movable in a vertical direction and a second member rotatably attached to the first member,
the cover section is fixed to the second member, and
the linking member has such a length that the linking member becomes taut while a state in which the first member is inserted in the casing bore is maintained.
2. The reading device according to claim 1, wherein the linking member is flexible.
3. The reading device according to claim 1, wherein the linking member has electrical conductivity.
4. The reading device according to claim 1, wherein the linking member is linked to the casing on an inside of the casing.
5. The reading device according to claim 1, wherein the linking member has such a length that the linking member becomes taut while the cable is slack.
6. The reading device according to claim 1, wherein the linking member is arranged in a position apart from the interposed member with an interval in an extending direction of a rotation axis of the second member.
7. An image forming apparatus comprising:
the reading device according to claim 1; and
an image forming section configured to form an image on a sheet, wherein
the controller is further configured to control the image forming section, and
the casing further houses the image forming section therein.
8. The reading device according to claim 1, wherein
a rotation axis of the cover section is positioned in a location where the second member is rotatably attached to the first member, and the cable and the linking member are each arranged in a position apart from the interposed member with an interval in an extending direction of the rotation axis.

* * * * *